United States Patent Office 3,682,647,
Patented Aug. 8, 1972

3,682,647
PRODUCTION OF HIGH PROTEIN READY-TO-EAT BREAKFAST CEREALS CONTAINING SOY AND MALT
William T. Bedenk, Springfield Township, Hamilton County, and Edward R. Purves, Forest Park, Ohio, assignors to The Procter & Gamble Company, Cincinnati, Ohio
No Drawing. Filed June 29, 1970, Ser. No. 50,922
Int. Cl. A23l 1/10
U.S. Cl. 99—83               24 Claims

ABSTRACT OF THE DISCLOSURE

A high protein content soy-containing ready-to-eat breakfast cereal is made palatable by first treating the soy with barley malt and water at elevated temperatures. After such a treatment the soy-malt mixture is preferably combined with a cereal grain and further processed into a breakfast food having a protein content of greater than 20% and having a pleasing taste.

BACKGROUND OF THE INVENTION

This invention relates to novel food products of the breakfast cereal class and processes for their production. More specifically, the invention relates to breakfast cereals of the cold or ready-to-eat breakfast cereal class, the two terms being used interchangeably. The breakfast cereals produced in accordance with the present invention are tasteful, have excellent eating qualities and are highly nutritious.

Prior attempts have been made to produce a breakfast cereal that is both tasteful and highly nutritious, i.e. for ready-to-eat cereals having a protein content of greater than 20%. Cereal grains such as corn, wheat, oats, and rice are quite tasteful and are commonly employed in producing a cold cereal product. Unfortunately, these cereal products are relatively low in their protein content and therefore not entirely satisfactory as a nutritious food product. Protein sources such as soy flour, wheat gluten, and milk protein have been incorporated into some prior art cereal formulations in an attempt to increase their protein value while retaining the pleasant taste of the base grain. In particular, soy flour has been the object of much work, not only as a cereal additive but also as the base grain due to its high protein content and relative abundance. Unfortunately, the soybean possesses a rather unacceptable taste so that its use in a cereal product has been limited, because only at low levels of soy content and, accordingly, low protein content is the characteristic soy taste undetectable in a cereal product.

Various processes have been developed in an attempt to alleviate the taste problems associated with a soy-containing cereal and have met with limited success. For instance, some of the constituents of the soybean that are organoleptically objectionable can be removed by an alcohol/water extraction process. Sugar coatings and various flavor additives also have been used to mask the rather bitter characteristic soy flavor.

Prior art cold cereal products containing a significant amount of soy also have drawbacks in addition to the aforementioned bitter taste of the soy. Eating quality of a cereal, as reflected by its crispness and tenderness, is also an important consideration. As used herein, crispness refers to the presence of a solid crunchy structure that can be detected while eating the cereal. The lighter and more frangible the structure the more crisp it is. The maximum degree of crispness of a cereal product is detected prior to being contacted with an aqueous liquid. After wetting with the aqueous liquid crispness steadily decreases with time until eventually a soggy and unacceptable product results. Sugar coatings on the individual cereal particles assist somewhat in maintaining the initial crispness of the cereal but sugar itself is soluble in the aqueous liquid, e.g. milk or cream, and therefore has only a temporary effect on the crispness or eating quality of the cereal. By the time the average consumer has gotten to the last portion of a breakfast cereal serving, the cereal has noticeably lost its initial crispness. Various edible hydrophobic materials such as animal or vegetable fats or oils have also been used in cereal formulations and as cereal particle coatings in an attempt to retard the diminishing of crispness but they too are not fully satisfactory.

Another aspect of a cereal's eating quality, as above mentioned, is its tenderness. Soy-containing cereals traditionally are not tender. Tenderness, in this context refers to the ease with which the cereal particle breaks down in the mouth. A cereal can be deficient in tenderness by being either hard or by being tough and leathery. Most cold cereal products become more tender after exposure to an aqueous liquid for a short length of time. High soy protein-containing cereals, however, become tough or leathery when soaked in an aqueous liquid with the result that the cereal product is not tender when eaten and, hence, objectionable to the average consumer.

Still another drawback experienced with the use of soy in a breakfast cereal encountered in "puffed" products is the adverse effect soy exerts on the puffability of a cereal particle. Ready-to-eat breakfast cereals are produced in many forms and shapes such as flakes, puffed cereal pieces, biscuits, granules, shreds and the like. A part of the process of producing the flaked and puffed form involves what is referred to as a puffing operation. During puffing relatively dense flakes and particles are converted into more porous and light flakes and particles by causing trapped moisture to expand very rapidly from the liquid state to the vapor phase. Soy, however, hinders this change in structure and thereby indirectly affects also the eating quality of the cereal since well-puffed cereals are more crisp and tender than poorly-puffed cereals.

Heretofore, ready-to-eat cereal products containing soy as the protein source, e.g. some containing up to 85% soy flour, have been produced, but all have generally met with limited receptivity by the consumer. Poor taste, poor eating qualities and with certain cereal forms, poor puffability have all contributed to the undersirability of soy in a ready-to-eat breakfast food.

It is the object of this invention to produce a high protein, soy-containing cold cereal product which is tender, which is free from objectionable soy taste, and which retains its crispness for a reasonable length of time after exposure to an aqueous liquid.

It is also an object of this invention to provide a novel process of producing a soy-containing cereal having the above referred to attributes by a method which does not cause puffing problems where puffing is employed.

These and other objects will become apparent from the following description of the invention.

SUMMARY OF THE INVENTION

This invention concerns a process for producing a novel cereal product that has excellent eating qualities, has a pleasing taste, and is nutritious. More specifically, cold breakfast foods are produced containing a soy protein source and barley malt, and additionally, in certain of the novel cold cereals, a cereal grain selected from the group consisting of corn, wheat, oats, rice, and mixtures thereof. The novel food products are produced by a process wherein the soy protein source, barley malt, and water are mixed together at an elevated temperature and then further processed into the final form suitable for the consumer. In the cold cereals containing a cereal grain the cereal grain is separately cooked and added to the heat treated soy protein, barley malt and water mixture to form a dough. This dough is then further processed into the final cereal form.

A preferred method of producing a nutritious and tasteful ready-to-eat cereal comprises treating the soy protein source with barley malt and water, extruding the mixture into strands, pelletizing the strands, flaking the pellets and puffing the flakes. The preferred method of producing the cereal products containing the cereal grain is to add a cooked cereal grain to the heat treated soy protein-barley malt mixture prior to extrusion to form a dough and then to further process the dough in the same manner used to produce the all soy protein-barley malt product.

DESCRIPTION OF THE INVENTION

In the present invention there are produced high protein content cold cereal products, i.e. they have a protein content of greater than 20%, that can be produced in any shape or form desired such as shredded, puffed, crumbled, biscuit, granule, flake, and the like. A protein source selected from the group consisting of soy flour, soy protein concentrate, and soy protein isolate provide the major source of protein for the food product while a cereal grain selected from the group consisting of corn, wheat, oats, rice, and mixtures thereof are added in alternative processes for flavor and texture.

As used herein, the soy protein source is defatted and refined. Soy flour currently commercially available contains approximately 40% to 60% protein on a dry weight basis and is to be contrasted with soy protein concentrate and soy protein isolate which contain on a dry weight basis 70% up to 90% and 90% up to 100% protein, respectively. As used herein soy flour contains on a dry weight basis 40% up to 70% protein. Depending on which protein source is used it is possible to add varying amounts of a cereal grain or other additives so that the final cereal will still possess a protein content of greater than 20%. Obviously greater latitude with respect to the amount of non-protein additions is possible when soy protein isolate and soy protein concentrate, or as more commonly referred to as soy isolate and soy concentrate, respectively, are used as the protein source than is possible with soy flour. Additionally, soy isolate possesses less of the characteristic soy taste and color than does the soy flour and soy concentrate. Soy flour, though, is the cheapest of the three protein sources and this makes it attractive as a protein source. Soy concentrate offers advantages over soy flour and soy isolate in that it imparts less of a soy taste to a cereal product made therefrom than does soy flour and is cheaper than soy isloate. Regardless of the soy protein source, though, the processing of it to make it more palatable and further processing of it into a final product suitable for the consumer is the same except as noted hereinafter. For the sake of clarity the following description of the process will be given with reference to the generic term soy protein source covering soy flour, concentrate, and isolate. It should be understood that soy flour, soy concentrate and soy isolate are used in the process with substantially the same results under substantially the same processing conditions except as otherwise noted. It should also be understood that the terms barley malt and malt have reference to the same material and are used herein interchangeably.

In accordance with the present invention the soy protein source is made more palatable, i.e., its crispness retention, tenderness, and taste are all improved by intially treating it with barley malt and water prior to processing it into a breakfast food product. In the absence of such a treatment a cold cereal product containing a soy protein source is very unacceptable. For a reason not precisely known, the barley malt and water treatment of soy protein under the critical conditions hereinafter disclosed has a very pronounced effect on the eating properties of the final product. The characteristic beany, bitter taste associated with the soybean is reduced to the extent that it is no longer objectionable. The taste improvement is even more pronounced with "puffed" products. Cereal particles that are subjected to a rapid heating or a sudden reduction in pressure causing entrapped moisture to expand rapidly are changed into more porous and lighter or puffed products. The barley malt and water treatment causes the soy-containing cereal particle to puff more easily thereby contributing to the taste improvement because the lighter and more porous type cereals have a tendency to not only possess better eating quality but also better flavor than the less porous or less puffed cereals.

Additionally, it was unexpectedly discovered that the treatment of soy protein in accordance with the conditions set out and thereafter processing it into a breakfast cereal resulted in products which were tender, i.e. upon exposure to an aqueous liquid they did not become chewy and leathery.

In accord with one aspect of the present invention soy protein is mixed with barley malt and water and thereafter combined with a cooked cereal grain to form a dough which can then be made into the desired final cereal form by any known cereal processing technique. The production of cold cereal products containing a cooked cereal grain is also a part of the present invention and will be discussed hereinafter.

In the production of an all soy-malt cold cereal product the soy protein, barley malt and water are first blended in any suitable blending apparatus well known in the trade, either batch type or continuous. In a batch type operation the amount of water based on the total mixture is 45% to 75%. Greater amounts can be used but are avoided because of the necessity after the treatment to partially remove the moisture to facilitate handling in the subsequent process steps. Lesser amounts of water are avoided because of the difficulty in handling the resultant viscous mixture. Most preferably 50% to 60% water is added based on the weight of the total mixture. Barley malt added in the range of 2% to 10% based on the dry weight of the soy protein source results in an improved product. Most preferably 4% to 6% barley malt based on the dry weight of soy protein is added. Malt in exces of 10% of the protein source can be used but preferably is not because of an excessive malt taste that is imparted to the cold cereal product at such levels.

The mixture is first subjected to a temperature of 80° F. to 200° F. for 1 min. to 120 min. Most preferably the mixture is held at 110° F. to 150° F. for 15 min. to 60 min. to obtain a treated soy protein that when made into a cold breakfast cereal results in a superior product.

After the soy protein malt mixture has been treated at the above temperatures the resultant dough is processed by any of several known methods of producing a ready-to-eat cereal product depending on form, type, or condition of the final product desired.

In accord with a preferred process, the dough resulting from the heat treating of the soy protein-malt mixture is extruded into strands of a relatively small cross-sectional area and thereafter sliced into small lengths thereby forming small pellet-like particles. These pellet-like particles are next partially dried, if necessary, and formed into flakes. The flakes are then subjected to a puffing operation to transform them into less dense and more porous or tender flakes. Toasting and/or coating operations may be employed to enhance the color and/or flavor of the resultant protein fortified cereal product. Alternatively, instead of producing a flake-like product, the flaking step can be omitted with a puffed spherical-shaped product being the result.

In the preferred method of transforming the dough into the finished product, the first step is to extrude the dough into strands. An extruder has the effect of mixing the ingredients even more intimately and of forming the dough into a shape easier to handle and more adaptable for existing equipment. Relatively low pressures in the extruder are sufficient for this operation. Pressures within the range of 500 p.s.i.g. to 1000 p.s.i.g. are preferred. Lower pressures can be used but should preferably be avoided since less of a mixing action in the extruder results from the low compressive forces associated with low pressures Pressures higher than 1000 p.s.i.g. exert little extra benefits and for this reason are avoided. Temperatures employed in the extrusion process are not a critical feature but do have some effect on the handling characteristics of the extrudant, such as stickiness and body. Temperatures falling within the range of 140° F. to 200° F. have been found to be satisfactory.

The shape of the strands that issue from the extruder is determined by the particular extruder die used in the outlet of the extruder and these strands, in turn, greatly influence the shape of the individual particles of the final product. For instance, if the shape of the strand is circular in its crosssectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next sliced so as to form pellet-like particles. The choice of the cross-sectional size of the strand issuing from die and the length of slice depends on the size requirement of the final individual piece of cereal. Such parameters can be easily determined and need not be set out in detail here.

After pelletizing the pellet-like particles are tempered, if necessary, and run through flaking rolls. Depending on the formulation and process conditions used throughout the process it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to two minutes is sufficient for the freshly cut pellets. With some formulations there may be no sticking problem in which case the strands and/or pellets can pass directly to the next operation without any tempering step.

If a flake-type cereal product is desired, the next step after pelletizing is to mechanically modify the pellets into flakes. This can be accomplished by passing the pellets between a pair of cooperating rollers or roller and a flat surface spaced apart a distance sufficient to produce the desired flake thickness. In accord with this invention it has been found that a flake thickness of 7 to 12 mils is sufficient to produce a satisfactory product. As the flakes leave the rolls they are in a dense and relatively hard condition. Such a flake is unacceptable to the average consumer and, accordingly, an additional processing step must be taken to produce a lighter, more porous and more tender flake structure.

Breakfast cereals obtain the desired flake structure by a process known as puffing. Puffing of the flake is also quite important in that it enhances the flake's crispness and tenderness. Cereal flakes containing untreated soy protein are difficult to puff but, unexpectedly, soy protein, when treated in the manner heretofore described, does not act as a hindrance on puffing of a ceral flake of which it forms a part and actually improves puffability. This factor is of importance in that the more porous type flakes have a tendency to be more tender than the less porous or less puffed flakes. Additionally, soy flavor is diminished even more in the better puffed of two soy-containing flakes. Basically, a cereal is puffed by causing trapped moisture in the flake to expand very rapidly from the liquid state to the vapor phase. Rapid heating or a rapid decrease in pressure are the methods commonly used to convert dense hard flakes into the more palatable porous tender flake. Both methods are well known and are commonly used throughout the industry. Gun puffing is an example of the principle of a rapid decrease in pressure. In this process the cereal flakes are first heated under high pressure and then the pressure is rapidly released to achieve the puffing effect. U.S. Pat. No. 3,253,533 describes a process of puffing a cereal flake by a rapid heating method.

To achieve the optimum puffing, care must be taken in the initial moisture content of the unpuffed flake. The specific moisture content that is best depends on the particular puffing process utilized and the particular soy protein. For instance, for a blend of soy isolate and malt a moisture content of 12% to 14% is optimum for gun puffing while 10% to 12% moisture content is best for puffing by a process that rapidly heats the flake. The optimum moisture content for any one particular flake composition and puffing technique can easily be determined experimentally.

Additional processing steps can be utilized if it is so desired. For instance a toasting operation can be used after the puffing step if it is desired to change the color of the flake to a more desired rich golden brown. Frequently, a slight toasting step also brings out a pleasant toasted flavor note.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

The above preferred process has been described in regard to producing a product having a flake-type structure. However, if a sphere-type product is desired the above described preferred process only has to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

In accord with another embodiment of this invention, a soy source, barley malt and water mixture is heated to the elevated temperatures aforementioned, and then combined with a cooked cereal grain to form a dough that is readily processed into a form suitable for human consumption. In this embodiment of the invention a greater percentage of malt can be added to the soy source-water mixture prior to heating the mixture than can be added to the soy source-water mixture of the process wherein no cereal grain is found in the formulation. In the latter situation, the level of malt addition is relatively low because of the unacceptable strong malt taste imparted to the product at levels greater than that aforementioned. However, in this embodiment the cereal grain addition allows the use of relatively high malt percentages based on the soy protein source because of the fact that the malt level based on the total product, i.e. soy protein source and cereal grain, is still less than that level over which the malt imparts a strong taste to the product. Accordingly, the following amounts of malt are used: 5% to 50% based on the dry weight of soy isolate; 3% to 35% based on the dry weight of soy concentrate; and 2% to 25% based on the dry weight of soy flour. Most preferably, the following amounts of malt are used: 10% to 35% based on the dry weight of soy isolate; 8% to 20% based on the dry weight of soy concentrate; and 5% to 13% based on the dry weight of the soy flour.

After mixing the above amount of malt with the soy protein source the mixture is heated to the aforementioned conditions of 80° F. to 200° F. for 1 minute to 120 minutes. Most preferably, the mixture is mixed at 110° F. to 150° F. for 15 minutes to 60 minutes. This mixture is then added to a gelatinized cereal grain and further processed.

The proportions of the treated soy protein and cereal grain combined depends on the particular protein source, the particular cereal grain and the desired protein content in the final product. The cereal grain used in admixture with the treated soy protein source in accord with this invention is selected from the group consisting of corn, wheat, oats, rice and mixtures thereof. Due to the fact that corn, rice, oats, and wheat have protein contents, albeit relatively small, consideration must be given to them as well as the protein content of the soy source in formulating the breakfast cereals of the present invention. Corn, rice, oats, and wheat have protein contents on a dry weight basis of approximately 9%, 7%, 14% and 12%, respectively. The exact protein contents of the cereal grain flour and the soy source, as well as the relative proportions of soy protein source and cereal grain flour blended together are determined routinely. Most preferably, the "base cereal particles," i.e. the cereal particle consisting of soy protein source and cereal grain contains on a dry weight basis the following percentages of soy source with the balance being the listed cereal grain:

|  | Soy flour | Soy concentrate | Soy isolate |
|---|---|---|---|
| Corn | 18–68% | 14–34% | 12–26% |
| Rice | 20–70% | 16–37% | 14–28% |
| Oats | 10–62% | 8–29% | 7–21% |
| Wheat | 14–64% | 10–31% | 9–23% |

Mixtures of the above cereal grains and soy sources are also readily formulated to contain the desired total protein content.

The cooking or gelatinizing of the cereal additive is performed under conditions similar to those commonly used in the industry. Thus, either a batch cooking or continuous cooking operation is used. Different methods of cooking include heating at atmospheeric pressure in an agitated kettle, heating at elevated pressure in a tumbling type mixer and heating under high pressure in a continuous mixer-extruder.

The amount of water and temperature needed to gelatinize the grains depends upon the particular grain and the particular method used. The preferred method of gelatinizing the cereal is by cooking in an extruder under pressure. Such a process is continuous and can be accomplished with greater ease. Additionally, the use of higher pressures attainable in the extruder allow the use of higher temperatures and also lower water levels than possible with a batch type cooking operation. The use of lower water levels thus minimizes the amount of drying required in subsequent steps. Using an extrusion type process at 100 p.s.i.g. to 200 p.s.i.g. pressure and temperatures in the range of 250° F. to 350° F., 12% to 25% water based on the total mixture is sufficient to gelatinize the cereal grain.

The gelatinized cereal grain can, at this point, be added to the soy protein-malt mixture and further processed to produce the cold cereal product. Preferably, though, the water content of the gelatinized cereal grain is reduced prior to mixing with the protein source. This additional operation is preferred at this point in the process so that subsequent handling and processing operations proceed more smoothly. Excessive moisture levels in the mixture cause subsequently formed individual cereal forms or shapes to be overly soft, sticky and difficult to handle. The amount of moisture present in the cooked cereal grain at the time of addition to the treated soy protein mixture must be relatively low because water already present in the soy protein-malt mixture will contribute significantly to the total moisture content of the mixture. It is preferred that 15% to 30% water be present in the soy protein-malt and cooked grain mixture when the product is being made by the preferred method, hereinafter described more fully. Accordingly, to reach the lower water levels often desired, less than 5% water must be present in the cooked cereal grain prior to mixing with the soy isolate-malt mixture. If the cereal is gelatinized by the continuous extrusion method under pressure, as in the preferred cooking method, the resultant extrudant may flash dry and thereafter contain less than 5% water and as such would not need the additional drying operation.

Depending on the cooking process used, it may be necessary to first break any lumps of cooked cereal formed during the cooking process so that proper drying, if needed, can be performed. Some cereals, in particular corn, have a tendency to agglomerate during the cooking stage and as a result the lumps are more difficult to dry thoroughly. A lump breaker well known to those skilled in the art is satisfactory for transforming the lumps into a form more suitable for drying. If, of course, no lumps or agglomerates were formed or drying is not needed this operation can be eliminated. Various types of equipment are available for the lump-breaking operation and can be used with equivalent results. After the partially dried cooked cereal grain and soy protein-malt mixture have been blended the resultant dough is processed in the manner above described with respect to the all soy protein-malt cold cereal product. That is, the dough is extruded into strands, pelletized, optionally flaked, and puffed. The process conditions previously given for these operations are applicable to a soy protein-malt and cereal grain cereal.

Additives such as fatty acids having a carbon chain length of 12 to 24 or salts of the acid can be included in the formulation as a processing aid. Cooked cereal grains have a tendency to be tacky and thereby cause sticking problems with regard to subsequent processing steps using the cooked grain. Cereal particles also have a tendency to agglomerate together during the cooking process thereby necessitating additional processing. The incorporation of 0.1% to 2% of the aforementioned fatty acid or fatty acid salt into the uncooked cereal grain on a dry weight basis reduces the agglomerating problem as well as the sticking or clogging up of processing equipment.

While rice, oats and wheat make a satisfactory product when blended with the soy isolate-malt mixture and processed in accordance with this invention, corn is the preferred cereal grain. A cereal dough of corn in admixture with the soy protein-malt mixture forms an especially tasteful and pleasing flake structure when formed into the final cold cereal product.

The following examples are given for the purpose of illustrating the production of the novel cold cereal products. Unless otherwise indicated, all percentages given are on a weight basis.

Example I

| Formulation: | Grams |
|---|---|
| Corn grits | 1400 |
| Salt | 30 |
| Soy isolate | 454 |
| Sucrose | 160 |
| Malt | 57 |

The corn grits (9% protein), salt, and 1000 grams water are mixed to form a mixture having a moisture content of 41% and then cooked at 250° F. under 18–20 p.s.i.g. for 60 minutes. The mixture is then partially dried after being run through a hammer mill to break up lumps found during the cooking. The cooked corn mixture at this point has a moisture content of 5%. The soy isolate (95% protein), sucrose, malt and 750 grams of water are blended to form a mixture having a 53% moisture content. This mixture is blended and held at 120° F. for 15 minutes. The level of malt is 12.5% based on the soy isolate. The cooked corn mixture and the soy isolate mixture are then blended and extruded into strands. In the extrusion operation the blend is subjected to 500 p.s.i.g. and a temperature of 200° F. The strands are sliced into pellets having a cross-sectional area of about 3/16 inch and length of about 3/16 inch. These pellets are next passed through a two-roll mill to produce flakes having a thickness of 0.010 inch. The flakes are now partially dried to 12% moisture to insure a proper puffing effect. The partially dried flakes are puffed by being contacted with hot salt at a temperature of 320° F. for 10 seconds. These flakes are well puffed, tender after exposure to milk and have a pleasant taste. The flakes have a protein content of about 26%.

For comparative purposes control flakes are made under the same conditions as above but with no malt-water treatment. These flakes after exposure to milk for the same length of time are less tender than the above flakes. The control flakes are also more dense or puffed less than the flakes of this example.

Example II

Formulation:                                      Grams
  Corn grits (9% protein) _____ 300
  Salt _____ 10
  Soy concentrate (70% protein) _____ 120
  Sucrose _____ 30
  Malt _____ 12

Flakes having the above composition are made by the same process as used in Example I. Based on this formulation the malt level is 10% of the soy concentrate. The resultant flakes have a protein content of about 23%. The flakes of this example are tender after exposure to milk and have a pleasant taste. Flakes having the same formulation as above but with no malt are tougher after exposure to milk.

Example III

Formulation:                                      Grams
  Corn grits (9% protein) _____ 80
  Salt _____ 2
  Soy flour (50% protein) _____ 100
  Sucrose _____ 40
  Malt _____ 10

Flakes having the above composition are made by the same process as used in Example I. The flakes of this example having protein content of about 24% are tender after exposure to milk and have a pleasing taste. Control flakes having the same formulation but with no malt are tougher after exposure to milk than the flakes of this example.

Example IV

Formulation:                                      Grams
  Soy flour _____ 100
  Malt _____ 5
  Sucrose _____ 10
  Salt _____ 2

The dry ingredients are blended with 165 grams water to form a mixture of about 58% water and is held at 120° F. for 25 min. The mixture is then passed through an extruder. In the extruder the mixture is subjected to 500 p.s.i.g. and 150° F. for 2 min. The extrudant is in the form of strands having a 3/16 inch diameter. These strands are tempered for 10 min. and then sliced into pellets 3/16 inch long. These pellets are next passed through a two roll mill to produce flakes having thicknesses of about 0.010 inch. These flakes are next puffed by being contacted for 5 seconds with hot salt having a temperature of 350° F.

After exposure to milk the flakes are tender and have a pleasant taste.

Control flakes made by the same process but with no malt addition are less tender after exposure to milk than are the flakes of this example.

What is claimed is:

1. A highly nutritious and palatable ready-to-eat breakfast cereal having a protein content of at least 20% containing a soy protein source and 2% to 10% malt by weight of the soy protein source.

2. The ready-to-eat breakfast cereal of claim 1 wherein the soy protein source is selected from the group consisting of soy isolate, soy concentrate, and soy flour.

3. The ready-to-eat breakfast cereal of claim 2 wherein the soy protein source is soy isolate.

4. A highly nutritious and palatable ready-to-eat breakfast cereal having a protein content of at least 20%, containing a cereal grain; a soy protein source selected from the group consisting of soy flour, soy concentrate, and soy isolate, and malt, and wherein, when the soy protein source is soy isolate the concentration of malt is from about 5% to about 50% based on the dry weight of soy isolate, and wherein when the soy protein source is soy concentrate the concentration of malt is from about 3% to about 35% based on the dry weight of the soy concentrate, and wherein when the soy protein source is soy flour the concentration of malt is from about 2% to about 25% based on the dry weight of the soy flour.

5. The ready-to-eat breakfast cereal of claim 4 wherein the cereal grain is selected from the group consisting of corn, wheat, oats, rice, and mixtures thereof.

6. The ready-to-eat breakfast cereal of claim 5 wherein the soy protein source is soy isolate and malt is present in the range of 5% to 50% by weight of the soy isolate.

7. The ready-to-eat breakfast cereal of claim 5 wherein the soy protein source is soy concentrate and malt is present in the range 3% to 35% by weight of the soy concentrate.

8. The ready-to-eat breakfast cereal of claim 5 wherein the soy protein source is soy flour and the malt is present in the range 2% to 25% by weight of the soy flour.

9. The ready-to-eat breakfast cereal of claim 6 wherein the cereal grain is corn.

10. The ready-to-eat breakfast cereal of claim 7 wherein the cereal grain is corn.

11. The ready-to-eat breakfast cereal of claim 8 wherein the cereal grain is corn.

12. A process of producing a highly nutritious and palatable ready-to-eat breakfast cereal having a protein content of at least 20%, comprising:
   (a) blending a soy protein source water, and from 2% to 10% malt by weight of the soy protein source to form a mixture;
   (b) subjecting the mixture to 80° F. to 200° F. for 1 minute to 120 minutes;
   (c) extruding the heated mixture into a strand;
   (d) slicing the strand into pellets; and
   (e) puffing the pellets to form the ready-to-eat breakfast cereal.

13. The process of claim 12 wherein the soy protein source is selected from the group consisting of soy isolate, soy concentrate, and soy flour.

14. The process of claim 12 further comprising adding a gelatinized cereal grain to the heated blend to form a dough prior to extrusion.

15. The process of claim 14 wherein the gelatinized cereal grain is selected from the group consisting of corn, wheat, oats, rice, and mixtures thereof.

16. The process of claim 15 wherein the soy protein source is soy isolate and 5% to 50% malt by weight of the soy isolate is blended with the soy isolate.

17. The process of claim 15 wherein the soy protein source is soy concentrate and 3% to 35% malt by weight of the soy concentrate is blended with the soy concentrate.

18. The process of claim 15 wherein the soy prtoein source is soy flour and 2% to 25% malt by weight of the soy flour is blended with the soy flour.

19. The process of claim 16 wherein the cooked cereal grain is corn.

20. The process of claim 17 wherein the cooked cereal grain is corn.

21. The process of claim 18 wherein the cooked cereal grain is corn.

22. The process of claim 19 further comprising flaking the pellets prior to puffing.

23. The process of claim 20 further comprising flaking the pellets prior to puffing.

24. The process of claim 21 further comprising flaking the pellets prior to puffing.

References Cited

UNITED STATES PATENTS

| | | | |
|---|---|---|---|
| 2,436,519 | 2/1948 | Luke | 99—83 |
| 2,478,438 | 8/1949 | Thompson et al. | 99—82 |
| 2,040,943 | 5/1936 | Kang | 99—83 |
| 2,881,076 | 4/1959 | Sair | 99—14 |
| 3,586,662 | 6/1971 | O'Connor | 99—17 X |

RAYMOND N. JONES, Primary Examiner